J. C. MORGAN.
TREAD ATTACHMENT FOR VEHICLE WHEELS.
APPLICATION FILED MAR. 28, 1916.
1,283,419.
Patented Oct. 29, 1918.
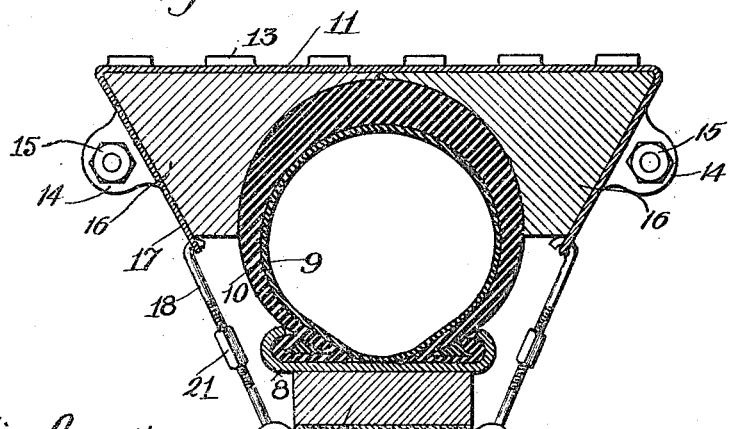
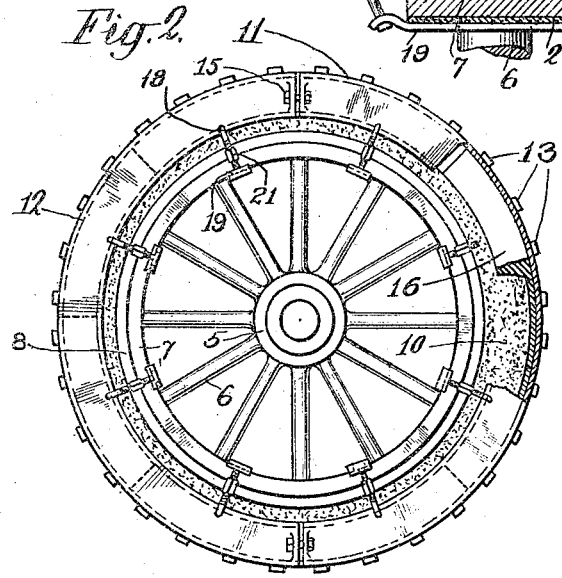
INVENTOR
Jesse Canby Morgan,
BY
ATTORNEY

UNITED STATES PATENT OFFICE.

JESSE CANBY MORGAN, OF PORTLAND, OREGON.

TREAD ATTACHMENT FOR VEHICLE-WHEELS.

1,283,419.   Specification of Letters Patent.   Patented Oct. 29, 1918.

Application filed March 28, 1916. Serial No. 87,236.

*To all whom it may concern:*

Be it known that I, JESSE CANBY MORGAN, a citizen of the United States, residing at Portland, county of Multnomah, and State of Oregon, have invented certain new and useful Improvements in Tread Attachments for Vehicle-Wheels; and I do hereby declare the following to be a full, clear, and exact description of the invention, such as will enable other skilled in the art to which it appertains to make and use the same.

This invention is directed to the provision of a tread attachment or tractor of a type adapted to be applied to the wheels of vehicles, particularly automobiles, to adapt the vehicle for use on rough ground. The invention is directed particularly to the provision of such a tread attachment which may be applied to the wheels of an automobile to adapt the car for use as a farming implement.

The invention involves the provision of a tread attachment or tractor which may be quickly applied to a wheel and so secured thereon in the proper position as to enable it to withstand strains imposed unevenly upon the tread and to prevent movement of the tread attachment around the wheel. To this end, the tractor consists of a plurality of separable parts curved in the direction of their length, preferably two such parts of semi-circular form being employed. These two parts are provided with means whereby they may be secured together at their ends, forming a complete circle extending around the tire of a vehicle. The tread portion of the tractor is formed of metal and is preferably provided with studs or projections to give a better grip upon the surface over which the vehicle travels. The tread portion is preferably in the form of a metallic sheet and under it are supporting members which coact with the wheel of the vehicle to properly support the tractor thereon and which aid in maintaining the tread portion in its proper shape. Preferably the supporting members consist of wooden pieces curved in the direction of their length to correspond with the curvature of the tire, these pieces being arranged parallel to each other at opposite sides of the tread portion and having their adjacent faces shaped to coact with the inflated tire of the vehicle. In combination with these parts, bracing members are employed which pass around the felly of the wheel to aid in securing the tractor to the wheel and also to coact with the spokes of the wheel to prevent turning movement of the tractor upon the wheel. These bracing members have adjusting devices therein preferably in the form of turnbuckles located at opposite sides of the wheel whereby they may be tightened up to the desired extent.

A tractor so constructed may be readily applied to the wheel of a vehicle by detaching the parts of the tractor sufficiently to permit of moving them over the periphery of the inflated tire. This having been done, the ends of the several pieces of the tractor may be secured together so that these pieces abut at their ends and form a continuous metallic tread around the tire of the wheel. Such tread attachments applied to the wheels of an automobile would make it possible to use the automobile as a farming implement for which use it would have to travel over comparatively rough ground. In such use, the metallic tread portion of the tractor would engage the rough surface so that the wheel would be protected against injury, ample resiliency would be provided by the inflated tire, a slight amount of tipping of the tractor would be permissible by reason of its resiliency and also the resiliency of the tire, and the relatively broad surface presented by the tractor would make it possible to use the vehicle over rough surfaces.

These and other features of the invention will be better understood by reference to the following description taken in connection with the accompanying drawing.

In the drawings, Figure 1 is a transverse section through the tractor, the inflated tire and the rim of the wheel; Fig. 2 is a front view of the wheel with the tractor applied thereto, certain of the parts being broken away.

Referring to these drawings, the tractor shown in Figs. 1 and 2 consists of a plurality of substantially rigid curved pieces adapted to be secured together at their ends to form a complete circle extending about an inflated tire positioned upon the wheel in the usual manner. In this instance, two such curved pieces are shown, each being semi-circular in form. The wheel consists of the usual hub 5, spokes 6, felly 7 and rim 8, and upon the rim is an inflated tire of any usual or suitable construction, here shown as consisting of an inner tube 9 and shoe 10. The two semi-circular sections of the tread attachment are shown at 11 and 12. Each is made of metal and presents a broad flat tread portion upon which projections 13 of any suitable character are preferably raised. Each of the tread sections 11 and 12 has integral members at its ends which may be employed for securing the two semi-circular sections together end to end. For this purpose, lateral projections 14 are shown as formed integral with the tread sections 11 and 12 at the ends thereof, these projections being perforated as shown to receive bolts 15 whereby the two sections may be detachably secured together at their ends.

The tread sections 11 and 12 are supported upon the inflated tire by means of supporting members or blocks underlying the tread section and extending along opposite sides thereof. These blocks are curved in the direction of their length to correspond with the curvature of the tread sections 11 and 12 and may be of the same length as the tread sections or may be formed of several parts lying end to end and aggregating in length the length of the tread section to which they are applied. These supporting members are shown at 16 in Figs. 1 and 2 and as shown in Fig. 2, consist of a plurality of short blocks 16 arranged end to end within each of the tread sections 11 and 12. The blocks 16 are positioned at opposite sides of the under surface of the tread section and their adjacent sides are curved to correspond with the curvature of the inflated tire, as is shown in Fig. 1. The non-adjacent sides of the blocks 16 are inclined inwardly as is shown.

A plurality of bracing members are applied to each of the sections of the tread attachment, each of these being secured at its ends to opposite sides of the tread section and extending over the felly to the wheel so as to aid in securing the tractor to the wheel and also to coact with the spokes of the wheel to prevent the attachment from moving around upon the wheel. In the present instance, the metal pieces constituting the tread sections 11 and 12 are provided with integral extensions 17 at their sides bent inwardly along the non-adjacent faces of the blocks 16 and projecting slightly beyond the inner edges of those blocks. The projecting edges of these extensions 17 are perforated to receive the bent ends of links 18 which are headed at their opposite ends to coact with the ends of links 19 extending across the inner surface of the felly 7 of the wheel. A strip of leather 20 is provided between each link 19 and the felly 7. Each of the links 18 is formed in two parts whose ends are reversely threaded to receive a nut 21 constituting an adjusting device for regulating the length of the link 18, thereby drawing the tread attachment up tightly upon the inflated tire until the projections 14 are in engagement.

Such a tread attachment may be readily applied to the wheel of a vehicle by first detaching the two sections 11 and 12 and applying them individually to the wheel with their ends abutting. The two sections are then connected again by means of the detachable bolts 15 coacting with the lateral projections 14 and when this has been done, the two tread sections are rigidly secured together so that they constitute in effect a continuous tractor encircling the inflated tire of the wheel. The tractor is then supported upon the inflated tire by means of the supporting members 16 which coact with the exterior surface of the inflated tire and the interior surfaces of the metallic tread sections 11 and 12. To more rigidly secure the tractor to the wheel, the links 18 and 19 are positioned in the manner shown and the nuts 21 turned so as to shorten the links 18 until the link 19 is drawn into hard engagement with the interior surface of the felly 7. The vehicle is then equipped for use on rough ground, as for instance, in employing it as a farming implement. In such use, the wheel and more particularly the inflated tire, would be protected against injury by the metallic surface of the tread attachment which, by reason of its hardness and breadth is well adapted for use on rough ground. These metallic tread sections, while being substantially rigid, possess a degree of resiliency sufficient to enable them to yield slightly as may be necessary in passing over obstructions which impose uneven strains upon opposite sides of the tread attachment. Furthermore, the construction illustrated is such that great strength and good wearing qualities are obtained, particularly in that the metal of the tread sections is turned inwardly at the lateral edges to inclose and reinforce the supporting members 16 which bear upon the inflated tire, and to provide attaching means for the braces which extend around the felly of the tire.

What I claim is:

1. The combination of a plurality of curved metallic pieces each in the form of a trough having a curved middle wall whose outer surface is roughened to grip the roadway and two side walls integral with the middle wall and extending inwardly from the lateral edges of the middle wall, two bodies located in each of said pieces and shaped to conform thereto, each bearing against the middle wall and one of the side walls thereof and each having its inner surface curved to coact with an inflated tire, means for bolting the pieces with said bodies therein together, end to end, around an inflated tire, and braces secured at their ends to the edges of said side walls and passing about the felly of the wheel.

2. The combination of a plurality of curved metallic pieces each in the form of a trough having a curved middle wall whose outer surface is roughened to grip the roadway and two side walls integral with the middle wall and extending inwardly from the lateral edges of the middle wall, two bodies located in each of said pieces and shaped to conform thereto, each bearing against the middle wall and one of the side walls thereof and each having its inner surface curved to coact with an inflated tire, means for bolting the pieces with said bodies therein together, end to end, around an inflated tire, and a plurality of braces each secured at its ends to opposite sides of one of said pieces and passing over the felly of the wheel, and adjusting devices in opposite sides of said braces to regulate the length thereof.

In testimony whereof I affix my signature.

JESSE CANBY MORGAN.

Copies of this patent may be obtained for five cents each, by addressing the "Commissioner of Patents, Washington, D. C."